United States Patent [19]

Kimball

[11] 4,159,136
[45] Jun. 26, 1979

[54] HYDRAULICALLY-ACTUATED MECHANICAL LATCH FOR TILT-CAB TRUCKS

[75] Inventor: Charles A. Kimball, Salt Lake City, Utah

[73] Assignee: Time Commercial Financing Corporation, Salt Lake City, Utah

[21] Appl. No.: 868,286

[22] Filed: Jan. 10, 1978

[51] Int. Cl.² ............................................. E05C 5/02
[52] U.S. Cl. .................................................. 292/111
[58] Field of Search ............... 292/109, 111, 112, 332, 292/201, 113, 110, DIG. 4, 129, 64, 65, 66, 122, 191, 192

[56] References Cited

U.S. PATENT DOCUMENTS

| 2,475,726 | 7/1949 | Six | 292/332 |
|---|---|---|---|
| 3,752,519 | 8/1973 | Nordell et al. | 292/111 |
| 3,841,693 | 10/1974 | Reynolds et al. | 292/111 |

Primary Examiner—Richard E. Moore
Attorney, Agent, or Firm—Mallinckrodt & Mallinckrodt

[57] ABSTRACT

A mechanical latch of the type widely utilized to retain, in closed position, an automotive truck cab that is pivoted to be swung open and closed above the truck engine (especially such a cab of the tractor unit of a transport truck-trailer combination) is constructed to be unlatched in customary manner, e.g. as in Nordell et al. U.S. Pat. No. 3,752,519, so that the cab can be raised by the usual hydraulic lift cylinders, but to be mechanically held against retractive, latching travel until forcibly released at such time as the cab is returned to normal driving position. In a preferred arrangement, the usual pivoted and axially extendable and retractable, hooked, latch element and the latch housing are provided with respective coactive locking formations for locking interengagement at the end of the extended stroke of the latch element, whereby such latch element is held against the urge of the retractive spring until forcibly released for retraction into cab-latching position in the usual manner.

9 Claims, 5 Drawing Figures

HYDRAULICALLY-ACTUATED MECHANICAL LATCH FOR TILT-CAB TRUCKS

BACKGROUND OF THE INVENTION

1. Field

The invention is in the field of mechanical latches, especially power-operated mechanical latches of the pivoted latch element type currently in use for latching and unlatching the cab of an automotive truck that has its cab pivoted to be swung open and closed relative to the engine of the truck, see for example Brimhall U.S. Pat. No. 3,797,882 and Nordell et al. U.S. Pat. No. 3,752,519.

2. State of the Art

In the aforementioned Brimhall patent, latching of a hooked latch element over a keeper bar is effected by the action of a small spring to move such latch element laterally toward the keeper bar following longitudinal retractive movement thereof, while in the aforementioned Nordell et al. patent similar lateral latching movement is effected by camming action on the back of the hooked latch element during such longitudinal retractive movement. In both instances, the longitudinal retractive movement of the hooked latch element is effected by the action of a relatively large and powerful, compressive, coil spring. In both, longitudinal extension of the hooked latch element (so that lateral movement thereof away from the keeper bar at the end of the extension stroke results in unlatching), is effected by the piston of a hydraulic power cylinder. At such time as hydraulic pressure on the piston is released following unlatching by reason of the power stroke of the piston, the powerful spring retracts the hooked latch element to its original retracted position. The hydraulic systems contemplated by these patents maintain pressure on the piston during all times that the hydraulic pumps incorporated in the respective systems are operating, so the latching element is effectively maintained in its extended position.

There are hydraulic systems, however, in this field of use that maintain pressure only during alternate strokes of the pistons of positive displacement pumps component to such systems, leaving no supportive pressure for the piston of a hydraulically actuated cab latch if incorporated into such a system. As a consequence, retraction of the hooked latch element following each power stroke of the pump piston would tend to relatch the cab before the cab lift cylinders could lift the cab sufficiently to prevent such relatching. Accordingly, the patented cab latches have not been employed with hydraulic systems of this type.

3. Objectives

It was a primary objective of the present invention to so construct the cab latches of the specified patents as to be useful in these other hydraulic systems, and to do so with a minimum of structural and functional changes in the original design.

SUMMARY OF THE INVENTION

In accordance with the invention, mechanical locking means are provided for holding the latch element in extended, unlatched position until forced out of that position. Although such locking means can take various forms, it is preferred to associate coactive locking members with the hooked latch element and with the latch housing, respectively, to positively hold the hooked latch element against retractive movement, as urged by the powerful spring, until such hooked latch element is forcibly pushed from its so-locked position at such time as the cab has been returned or almost returned to its normal driving position.

THE DRAWING

A truck cab latch incorporating what is presently contemplated as the best mode of applying the invention in actual practice is illustrated in the accompanying drawing, in which:

FIG. 1 represents a longitudinal, vertical, axial section of the latch in latched position relative to a keeper bar and showing the latch element and power piston in side elevation;

FIG. 2, a similar section taken on the line 2—2 of FIG. 1;

FIG. 3, a view in horizontal section taken on the line 3—3 of FIG. 1;

FIG. 4, a view corresponding to that of FIG. 1, but showing the latch in unlatched position at the termination of its extension stroke; and FIG. 5, a horizontal section taken on the line 5—5 of FIG. 4 and drawn to a larger scale.

DETAILED DESCRIPTION OF THE ILLUSTRATED EMBODIMENT

Figure 1:
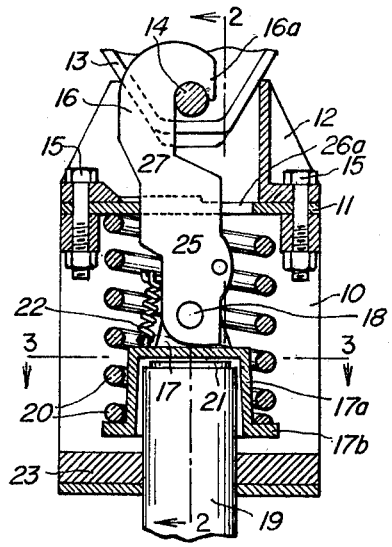

The truck cab latch of the invention may be constructed in a manner generally similar to the truck cab latch of either of the aforementioned patents. As illustrated, it is generally similar to the cab latch of the Nordell-Kimball patent and comprises a latch housing 10 having a cover plate 11 surmounted by a superstructure 12 adapted to receive mount 13 for keeper bar 14 as the truck cab is returned to normal driving and latching position from tilted position following completion of inspection of or work on the truck engine or other component. In the form shown, superstructure 12 and cover plate 11 are secured to housing 10 by bolts 15.

Although it is usual and preferred to mount the cab latch on the truck frame and the latch keeper on the tilt cab, this can be reversed as in the earlier cab latches of the aforementioned patents.

As in the earlier cab latches, the hooked latch element 16 is elongate and preferably flat. It is configured to provide a hook formation 16a at one end and is pivotally attached at its other end to a clevis element 17, FIG. 2, by a pivot pin 18. In this instance, the clevis element has an inversely cupped base 17a, for receiving the free end of hydraulic power cylinder 19 and is externally flanged, as at 17b, for seating powerful, compressive, coil spring 20 that serves to motivate the retraction stroke of latch element 16.

Figure 4:
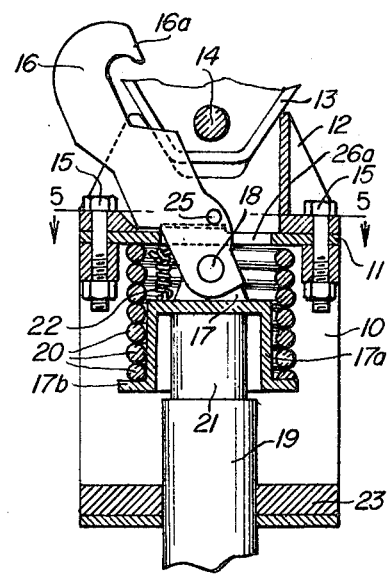

Latch element 16 is extended from its latching position of FIG. 1 by means of the piston 21, FIG. 4, of power cylinder 19 at such time as it is desired to tilt the truck cab from its normal, driving position, relatively light spring 22 serving to move the latch element laterally as soon as its hook 16a clears keeper bar 14.

To save installation space, hydraulic power cylinder 19 protrudes into latch housing 10 through housing bottom 23 in the present construction and is accommodated by the inverted cup portion 17a of clevis element 17. Cylinder 19 is rigidly secured in housing bottom 22.

The cab latch of the invention is particularly useful in connection with a hydraulic system which does not maintain pressure in the system during the return stroke of the piston of a positive displacement pump. In such a system utilizing a cab latch of either of the aforementioned patented types, there would be a relatching on each such return stroke of the pump, thereby defeating the action of the lift cylinders. The cab latch of the present invention, however, eliminates relatching when there is no fluid pressure maintaining the hooked latch element in extended, unlatched position.

For this purpose mechanical locking means are provided. In the form illustrated, coactive locking members are associated with the hooked latch element and with the latch housing, respectively.

Although coactive locking members of various types can be utilized, the best mode presently contemplated employs detent means, projecting transversely from the hooked latch element, and detent-engaging portions of the latch housing closely encompassing such latch element, there being passage for the detent means past such housing portions in alignment with the detent means during extension and retraction travel of the latch element and there being means preventing lateral movement of the latch element until the detent means pass such housing portions. The detent means are located on the latch element so as to have just passed the housing portions at the termination of the extension stroke of the latch element, thereby being engaged and retained by such housing portions upon lateral movement of the latch element at the termination of its extension stroke.

Figure 5:
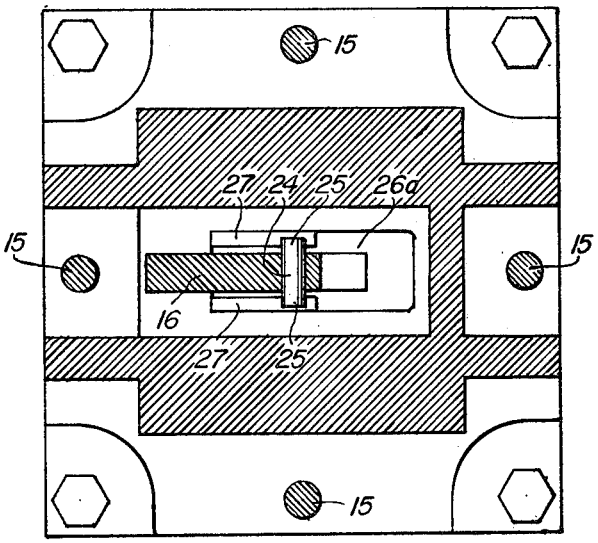
Figure 3:
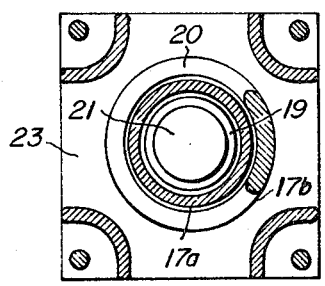

As illustrated, see particularly FIG. 5, a pin 24 is secured, as by a press fit, in a receiving hole in hooked latch element 16, extending therethrough and projecting therefrom transversely of the latch element as detent members 25, respectively, at opposite sides of the latch element and within its forward margin.

Housing cover plate 11 is slotted to provide an elongate opening 26 through which hooked latch element 16 extends, with the portions of such cover plate that define the opening closely encompassing the latch element. In the illustrated form, opening 26 is provided by slitting the material of plate 11 and bending up plate portions 27, respectively, that are marginal to the slit, thereby providing detent-engaging rails upon which respective detent members 25 slide when latch element 16 is moved laterally by spring 22 at the termination of its extension stroke. Such rails and detent members lock latch element 16 against retraction under the urging of powerful spring 20 when there is no fluid pressure supporting piston 21 in its extended position.

For passing detent members 25 during extension travel of hooked latch element 16, opening 26 is extended into the paths of travel of such detent members, as at 26a, and such extension is made sufficiently wide to accommodate the detent members.

The means for preventing lateral movement of the latch element until the detent structure passes through extension 26a of opening 26 is conveniently a shoulder formation 16b on the back of hooked latch element 16 and formed as a part of the external configuration of such latch element.

Figure 2:
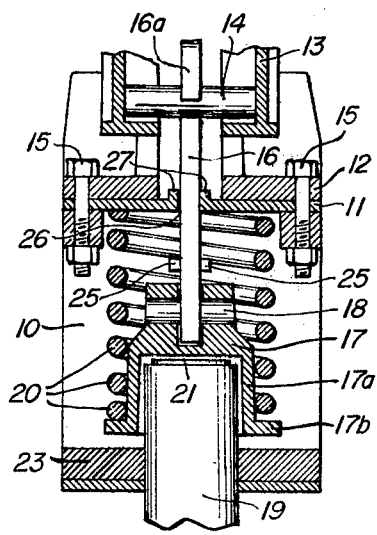

When the truck cab is returned from its tilted position to its normal, operative position in the usual way, hooked latch element 16 is forcibly moved laterally from its locked, open position of FIG. 4 to its latching position of FIGS. 1 and 2 either manually (the cab latch is usually accessibly located outside the cab) or by a striker plate (not shown) appropriately positioned and secured to the truck cab to contact the back of hooked latch member 16 opposite hook formation 16a shortly before such cab has reached its normal, operative position and thereby cam such latch member out of locked position for retraction into cab latching position.

It should be realized that the mechanical locking means may take various forms. For example, a second and smaller hooked latching element may be pivoted in common with hooked latching element 16 so as to engage a pin on superstructure 12 when in the extended, unlatched position. Again, a spring-biased arm could be pivoted to the housing for engaging clevis 17 to prevent its retraction when latching element 16 is in the extended, unlatched position.

Whereas this invention is here specifically illustrated and described with respect to a particular embodiment thereof presently contemplated as the best mode of carrying out the invention, it is to be understood that other embodiments may be constructed without departing from the generic scope of the invention as defined herein and set forth in the claims that follow.

I claim:

1. In a pressure-fluid-operated, mechanical latch for tiltable truck cabs, wherein an elongate, hooked latch element is pivotally mounted within a latch housing for extension and retraction longitudinally thereof and for latching and unlatching movements laterally thereof with respect to a keeper bar, the improvement comprising mechanical locking means for holding said latch element in extended, unlatched position until forced out of said position.

2. The improvement set forth in claim 1, wherein the locking means comprise coactive locking members associated with the hooked latch element and the latch housing, respectively.

3. The improvement set forth in claim 2, wherein the locking means associated with the latch housing comprises housing portions closely encompassing the latch element and defining an opening through which said latch element travels during longitudinal extension and retraction thereof, wherein the locking means associated with the latch element comprises detent structure projecting transversely from said latch element beyond said closely encompassing portions of the housing, said opening having a wider extension through which the latch element also travels during longitudinal extension and retraction thereof, said detent structure being aligned with said extension of the opening during said travel of the latch element, and said extension of the opening being dimensioned to pass the detent structure, said detent structure being located on the latch element so as to have passed through said extension of the opening before the latch element reaches the termination of its extension travel, whereby lateral movement of said latch element at or near the termination of its extension travel will position said detent structure over said closely encompassing portions of the housing; and wherein means are provided for preventing said lateral movement of the latch element until the detent structure passes through said extension of the opening on the extension travel of the latch element.

4. The improvement set forth in claim 3, wherein the detent structure associated with the hooked latch element comprises a pair of pin members projecting from respective, mutually opposite faces of said latch element.

5. The improvement set forth in claim 4, wherein the means for preventing lateral movement of the latch element comprises a shoulder member at the back of said latch element.

6. The improvement set forth in claim 5, wherein the shoulder member is formed as part of the external configuration of the latch element.

7. The improvement set forth in claim 3, wherein the latch housing has a cover member through which the opening extends as an elongate slot, the locking means associated with said latch housing being track members marginal to said opening.

8. The improvement set forth in claim 7, wherein the track members are formed by bent-up portions of the cover member displaced from said cover member to form the opening.

9. The cab latch set forth in claim 1, wherein there is included in the combination of elements a hydraulic power cylinder having a latch-activating piston and adapted to be supplied with hydraulic fluid from a system in pressure pulses that alternate with non-pressure periods, said piston serving to extend the latch element; spring means for moving said latch element laterally; and relatively more powerful spring means for retracting said latch element after such latch element has been forced out of the unlatched position in which it is held by the locking means.

* * * * *